S. H. Tift,
Clothes Drier,
No. 789, Reissued Aug. 2, 1859.
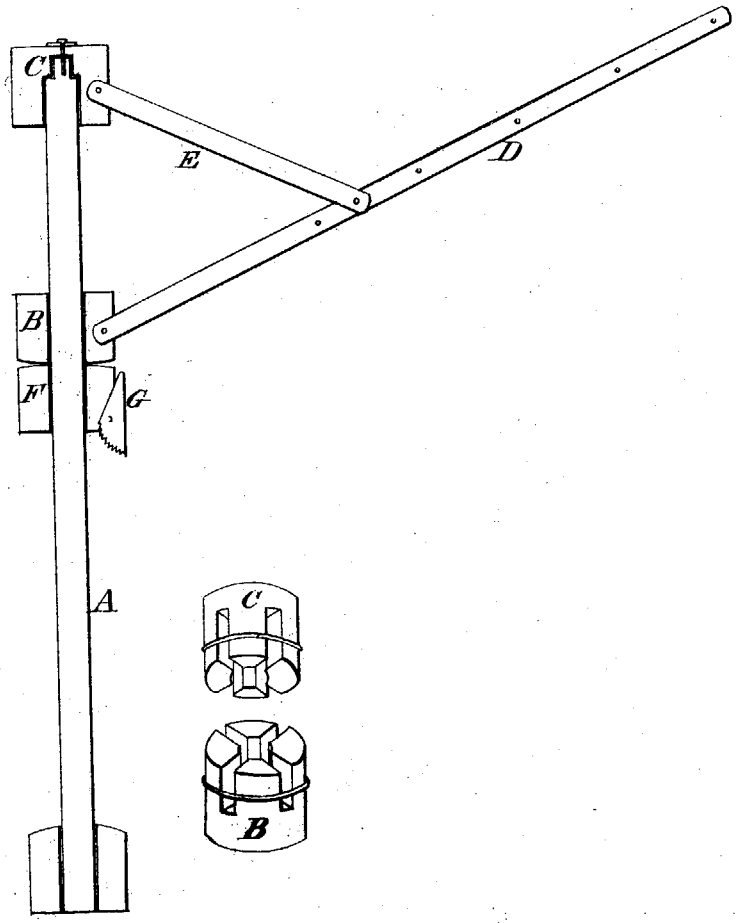
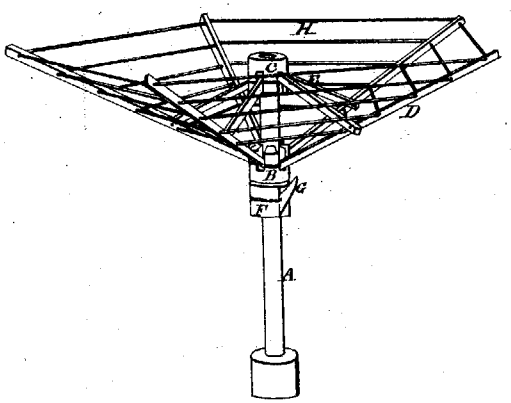
M. PETERS, PHOTO-LITHOGRAPHER, WASHINGTON, D. C.

UNITED STATES PATENT OFFICE.

S. H. TIFT, OF MORRISVILLE, VERMONT.

IMPROVED CLOTHES-DRIER.

Specification forming part of Letters Patent No. 20,964, dated July 20, 1858; Reissue No. 789, dated August 2, 1859.

*To all whom it may concern:*

Be it known that I, STEPHEN H. TIFT, of Morrisville, in Morristown, in the county of Lamoille, in the State of Vermont, have invented a new and useful mode of constructing a machine for the purpose of hanging on wet clothes to dry; and I do hereby declare that the following is a full and exact descripton thereof, reference being had to the accompanying drawings, and to the letters of reference marked thereon.

The nature of my invention consists in so constructing the machine that the arms will always be properly held in position under all circumstances of contraction or expansion of the cords, while the frame will be at liberty to turn upon the shaft. This desired result I arrive at by combining with the other parts of the drier a sliding collar, with a ratchet-catch capable of being secured to the shaft at any point, and affording a bearing for the sliding head of the folding frame.

The drier is made up of the following parts: First, an upright shaft, A. This is a round shaft seven feet in height and two and one-fourth inches in diameter, with tenon on top one and half inch in diameter and two inches in length, said shaft to be set in a perforated post or other solid substance in the ground. Second, one hub (marked B) four and half inches in length and four and half inches in diameter, and perforated to admit said shaft, and sliding up and down thereon, and mortised or slotted, with five mortises extending from the upper end of said hub down two inches and through to the shaft A. Third, one hub (marked C) four and half inches in length and four and half inches in diameter, and slotted in lower end and placed upon top of shaft A, being bored out to receive it, substantially as shown in the drawings, and fastened to said shaft by means of a bolt passing through a cap down into top of shaft A. Fourth, five arms (marked D) six and half feet in length, one and half inches wide, by three-fourths inch in thickness, and hinged at lower end to hub B in the mortises by means of a malleable metallic wire passing through the arms and around said hub in a groove of the size of wire. Fifth, five braces (marked E) three feet in length and one and half inches wide by three-fourths inch in thickness, and one end fastened to hub C in the same manner as arms D are to the hub B, only on the lower end of hub C, and the other end hinged to arms D by means of a round-headed rivet and collar or washer, at a distance of three feet from lower end of said arms. Sixth, a sliding collar (marked F) four and half inches in length and four and half inches in diameter, perforated so as to admit shaft A, loosely enough to permit collar F to pass up and down on said shaft. Seventh, a catch (marked G) composed of iron, and perforated so as to admit a malleable-iron wire passing through it and around the collar F in a groove, the collar being slotted to receive said catch, which is rounded on lower end and notched so as to fasten into shaft A by pressing down on collar F. Eighth, common-sized clothes-lines (marked H) passing around on arms D through perforations in said arms, and of such length as to be tight when said arms are properly spread, the arms, braces, hubs, and cord having a rotary motion around shaft A.

The operation of the drier is as follows: The hub B is moved up shaft A, spreading the arms D; collar F is forced up under the hub, and when the frame is sufficiently stretched the lower extremity of the serrated catch G is forced into the shaft, and the collar thus held in position. This collar constitutes a movable bearing for the hub B, supporting the same, and having the frame free to rotate.

This construction possesses the following advantages: It admits of the frame being secured at the precise point where stretching ceases, which is variable from the change in the condition of the cord. This securing is moreover performed so as to leave the frame free to rotate.

I claim my construction to possess advantages over those constructions where the sliding hub is secured by a pin passed through the up right shaft, as this not only prevents the frame from turning, but, with any number of holes that can be made in the shaft, it is not at all probable that the pin will strike one at the termination of the stretching operation, whereas my hub is secured at the precise point.

Having described my invention and the operation thereof, I disclaim the mere combination of a sliding hub with expanding arms, as such does not not constitute my invention; but What I do claim as new, and desire to secure by Letters Patent, is—

The combination of the slotted perforated hub B and slotted bored cap-hub C with the arms D and braces E, connected with the hubs by wires, as described, and the arrangement the same with the shaft A, collar F, and ratchet-catch G, as specified.

In testimony whereof I hereunto subscribed my name before two subscribing witnesses.

S. H. TIFT.

Witnesses:
GEO. PATTEN,
JOHNS HOLLINGSHEAD.